US010482441B1

(12) United States Patent
Watson et al.

(10) Patent No.: US 10,482,441 B1
(45) Date of Patent: Nov. 19, 2019

(54) SYSTEMATIC CROWDSOURCING OF GEOLOCATION DATA

(71) Applicant: United Services Automobile Association (USAA), San Antonio, TX (US)

(72) Inventors: James Christopher Watson, San Antonio, TX (US); Gina R. Smith, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 605 days.

(21) Appl. No.: 15/064,887

(22) Filed: Mar. 9, 2016

Related U.S. Application Data

(60) Provisional application No. 62/143,449, filed on Apr. 6, 2015.

(51) Int. Cl.
| | | |
|---|---|---|
| *G06Q 20/20* | (2012.01) | |
| *G06Q 20/32* | (2012.01) | |
| *G06Q 20/40* | (2012.01) | |
| *G06Q 20/42* | (2012.01) | |

(52) U.S. Cl.
CPC ....... *G06Q 20/202* (2013.01); *G06Q 20/3224* (2013.01); *G06Q 20/401* (2013.01); *G06Q 20/42* (2013.01)

(58) Field of Classification Search
CPC ............ G06Q 20/202; G06Q 20/3224; G06Q 20/401; G06Q 20/42
USPC ................ 705/21, 16, 39, 44; 713/168, 150; 235/487, 492; 726/7, 3
See application file for complete search history.

(56) References Cited

U.S. PATENT DOCUMENTS

| | | | | |
|---|---|---|---|---|
| 2009/0228336 | A1* | 9/2009 | Giordano | G06Q 20/04 705/75 |
| 2010/0280956 | A1* | 11/2010 | Chutorash | G06Q 20/20 705/64 |
| 2012/0144468 | A1* | 6/2012 | Pratt | G06F 21/40 726/7 |
| 2012/0244885 | A1* | 9/2012 | Hefetz | G06Q 20/32 455/456.2 |
| 2014/0149240 | A1* | 5/2014 | Ansel | G06F 17/30705 705/21 |
| 2014/0180854 | A1* | 6/2014 | Bryant, II | G06Q 20/401 705/21 |
| 2014/0250026 | A1* | 9/2014 | Dill | G06Q 30/02 705/325 |
| 2014/0279465 | A1* | 9/2014 | Capps | G06Q 20/102 705/40 |
| 2015/0073985 | A1* | 3/2015 | Hadinata | G06Q 20/40145 705/44 |
| 2016/0048818 | A1* | 2/2016 | Tulluri | G06Q 20/10 705/43 |

* cited by examiner

*Primary Examiner* — Vanel Frenel
(74) *Attorney, Agent, or Firm* — Perkins Coie LLP

(57) ABSTRACT

Embodiments disclosed herein include systems and methods for systematic crowdsourcing of geolocation data. Transaction data that includes an identification of a point of sale device and an identification of a payment vehicle used in the transaction can be received. A confidence in a location of the point-of-sale device can be calculated. When the confidence of the location of the point-of-sale device is lower than a threshold confidence, a location of a device associated with an owner of the payment vehicle can be determined. An updated confidence in the location of the point-of-sale device can be generated based at least in part on the location of the device.

20 Claims, 5 Drawing Sheets

SYSTEMATIC CROWDSOURCING OF GEOLOCATION DATA

CROSS-REFERENCE TO RELATED APPLICATION

This application is a non-provisional of and claims priority to U.S. Provisional Application No. 62/143,449, filed on Apr. 6, 2015, entitled "SYSTEMATIC CROWDSOURCING OF GEOLOCATION DATA," which is hereby incorporated by reference in its entirety for all purposes.

TECHNICAL FIELD

Various embodiments of the present disclosure generally relate to crowdsourcing. More specifically, various embodiments of the present disclosure relate to methods and systems for systematic crowdsourcing of geolocation data.

BACKGROUND

Organizations, merchants, and customers incur thousands of dollars of losses due to fraud relating to payment vehicles such as credit cards and debit cards. To prevent fraud, some card issuers seek to compare a location of a user device associated with the cardholder with a location of the merchant to determine whether the user is physically at the location of the merchant at the time of purchase. Obtaining the location of the merchant for comparison to the location with the cardholder can be determined using various methods.

BRIEF DESCRIPTION OF THE DRAWINGS

Embodiments of the present disclosure will be described and explained through the use of the accompanying drawings in which.

Figure 1:
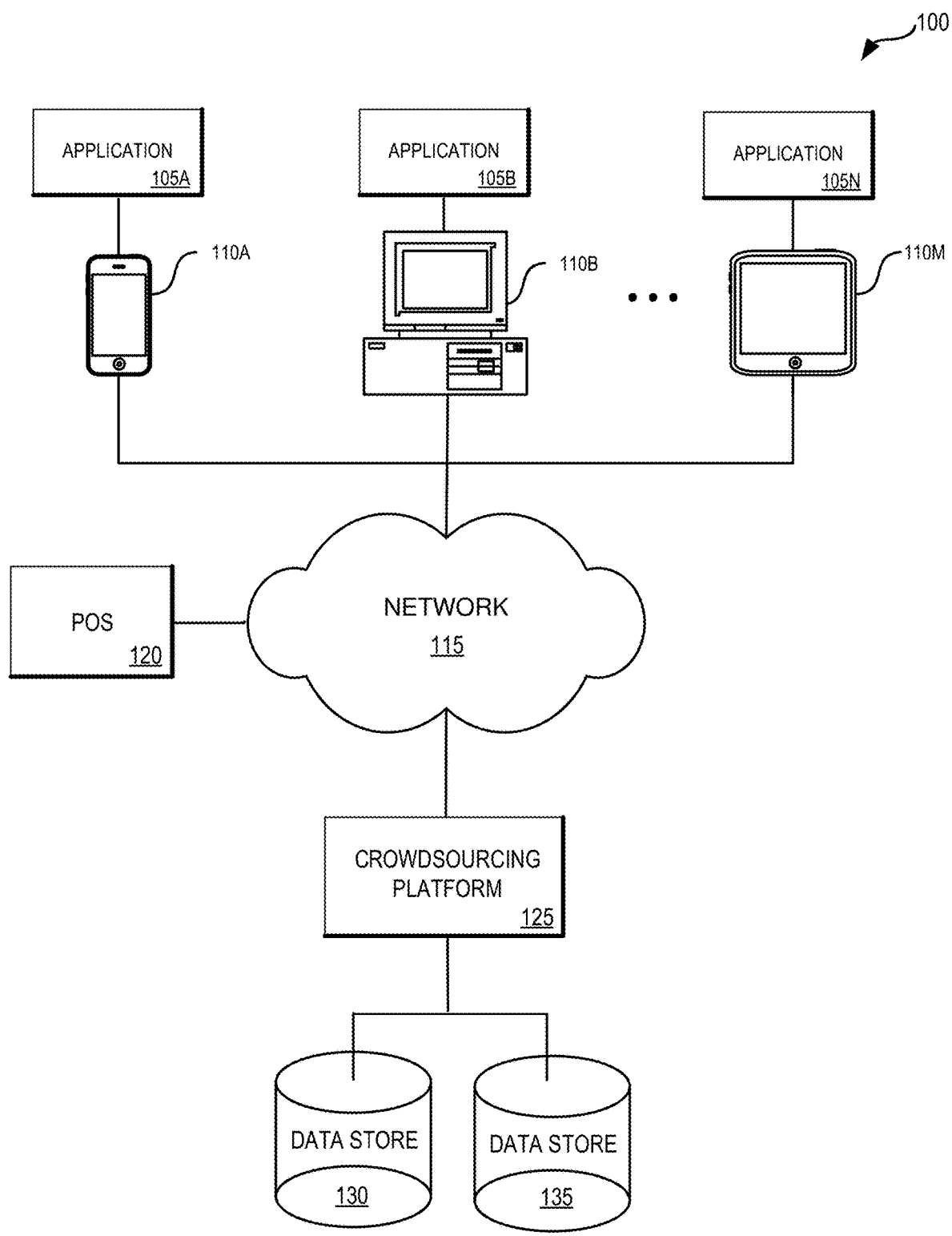
FIG. 1 illustrates an example of a network-based operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to crowdsourcing. More specifically, various embodiments of the present disclosure relate to methods and systems for systematic crowdsourcing of geolocation data for deriving location information.

Organizations, merchants, and customers incur thousands of dollars of losses due to fraud relating to payment vehicles such as credit cards and debit cards. To prevent fraud, some card issuers seek to compare a location of a user device associated with the cardholder with a location of the merchant to determine whether the user is physically at the location of the merchant at the time of purchase. However, current methods of establishing a cardholder's physical presence within a reasonable distance of a point-of-sale ("POS") at the time of purchase lack consistency and accuracy. The lack of consistency and accuracy is due at least in part to the difficulty in determining a location of the merchant, and, in some cases, the POS of a merchant. For example, some card issuers may attempt to establish the location of the POS using merchant address data in a card authorization message, but the card authorization message may not always include the merchant address or may include an incorrect or outdated merchant address.

Even if the merchant address data is included in the card authorization message, the merchant address data may not be granular enough to verify that the user is within a reasonable distance of a POS. For example, the merchant may be in a mall location with many other vendors having the same address except for a suite number. In such circumstances, comparing the location of the user's user device with the merchant's address could lead to inaccurate results (i.e., a thief may be using the card in one part of the mall while the cardholder is in a different part of the mall). Therefore, a more accurate location of the merchant may be necessary.

Additionally, some merchants change locations routinely. For example, some merchants set up temporary stands or attend events such as state fairs. Current systems do not have a method of tracking these merchant locations.

In some embodiments, the location of merchants may be identified using crowdsourcing techniques. For example, when a cardholder swipes a payment card at a POS, a location request can be sent to the cardholder's user device. The location of the user device can be recorded as a possible location of the merchant, which may be repeated across several cardholder interactions with the merchant until the location of the merchant is reliably determined. To determine the location of the user device (and eventually the merchant), the user may supply location information in response to a request (e.g., via text message, push notification) and/or the system may determine the location of the merchant using GPS, cellular triangulation, or other methods used to track the user device. In some embodiments, the user's response may include the location of the user device.

In some embodiments, merchant location data may be parsed from the card authorization message. If the merchant location data is included in the card authorization message, a combination of the merchant location data from the card authorization message and the location of the user device may be used in combination with other data points to establish a location of the merchant.

When a crowdsourced location of the merchant is reliably established in the system to a certain threshold (e.g., data from thirty customers has been collected with 88% same results), the card issuer may take fewer samples of location data from user devices. For example, the card issuer may receive a merchant authorization request from a Harbor Freight® store in Austin, Tex. If the location of this store is established to a certain confidence level, the system may determine that location of the user device is necessary only for a quality check and may ask only every nth (e.g., tenth) customer (e.g., the confidence level may drop below the threshold every nth customer, triggering an update). In some embodiments, particularly when the location of the merchant is known to a certain confidence level, the location of the user device can be compared to the location of the merchant as a security measure.

This disclosure describes location determination techniques and processes designed to reduce inefficiencies in determining and verifying a merchant location using crowdsourcing techniques. Various embodiments may provide one or more of the following technological improvements: 1) improved location determination techniques and systems within a crowdsourcing platform; 2) improved security for transactions; 3) improved user experience by increasing accuracy in merchant location thereby decreasing the number of false positives of fraud; and/or 4) increased number of merchant locations known.

In the following description, for the purposes of explanation, numerous specific details are set forth in order to provide a thorough understanding of embodiments of the present disclosure. It will be apparent to one skilled in the art upon reading the disclosure, however, that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device, a mobile phone, a tablet computer, a mobile media device, a wearable computing device, a mobile gaming device, a vehicle-based computer, a dedicated terminal, a public terminal, desktop or laptop computer, a kiosk, etc.). In some embodiments, applications 105A-105N may be stored on the computing device or may be stored remotely. These computing devices can include mechanisms for receiving and sending traffic by connecting through network 115 to Point-of-Sale ("POS") 120, crowdsourcing platform 125, and data stores 130 and 135.

Computing devices 110A-110M may be configured to communicate via the network 115 with crowdsourcing platform 125. In some embodiments, computing devices 110A-110M can retrieve or submit information to crowdsourcing platform 125 and run one or more applications with customized content retrieved by crowdsourcing platform 125 and data stores 130 and 135. For example, computing devices 110A-110M can execute a browser application or a customized client to enable interaction between the computing devices 110A-110M and crowdsourcing platform 125 and data stores 130 and 135.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

POS 120 can be the place or mechanism in which a retail transaction is completed. In other words, a customer may pay a merchant for goods or services at POS 120. During a transaction, POS 120 may receive one or more payment mechanisms (e.g., a payment vehicle) from a customer and may request authorization from an organization to process the transaction using the one or more payment mechanisms. POS 120 may also issue receipts for the transaction. In some embodiments, the POS 120 may be a payment portal website.

Crowdsourcing platform 125 can be running on one or more servers and can be used to receive transaction authorization requests from POS 120 (e.g., a request to authorize a purchase at a POS using a payment vehicle). When an authorization request is received from POS 120, crowdsourcing platform 125 may determine whether reliable location information is known for POS 120 and/or the merchant associated with POS 120. Crowdsourcing platform 125 may be communicably coupled with POS 120, data stores 130 and 135, and computing devices 110A-110M. Crowdsourcing platform 125 may communicate, access, or receive data (e.g., user profiles, merchant location information, transaction criteria, verification information, etc.) from computing devices 110A-110M, POS 120, and/or data stores 130 and 135. Crowdsourcing platform 125 may be associated with a membership organization, and the users may be members or potential members of the membership organization. The organization may be a financial institution and/or an insurance company.

Based on a confidence level that crowdsourcing platform 125 has in the merchant location information associated with the transaction, crowdsourcing platform 125 may send a request to computing device 110A-110M for computing device's 110A-110M location to collect a data point of merchant location information, which can be combined with other data points to determine a location of the merchant. The request may be based on an analysis of the data points (e.g., location data associated with computing devices during transactions received from various authorization requests from POS 120), various user interfaces running on computing devices 110A-110M, and/or other interactions, communications, and/or other inputs (e.g., emails, tokens, and/or communications via other channels) with transaction and location information. Crowdsourcing platform 125 can be calibrated/configured by individual companies or service providers based on risk tolerance and/or other business objectives to determine merchant locations and set confidence thresholds.

In some embodiments, determining whether to send the request to confirm the transaction and/or provide location information to computing devices 110A-110M may be based on a preference of the user. For example, some users may have indicated a preference of receiving an authorization message from the organization when the user's credit card is being used and sending a verification that the user authorized the transaction to the organization, in which case a verification may be sent. However, some users may have indicated a preference of not receiving authorization messages to verify a transaction and/or a preference of not allowing the organization to track a location of computer devices 110A-110M associated with the user. In such cases, notification will not be sent to the user and/or the location of the computing device 110A-110M will not be tracked.

In some embodiments, crowdsourcing platform 125 includes various data processing and analytic tools that allow for implementation, creation, and evaluation of merchant location data retrieved from data stores 130 and 135 and collected from computing devices 110A-110M and POS 120.

Data stores 130 and 135 can be used to manage storage and access to merchant location information derived from location data of computing devices 110A-110M during transactions. Data stores 130 and 135 also can be used to manage storage and access to user data such as transaction criteria, notification preferences, location tracking preferences, registered user devices, user identifications, token IDs, financial information, authentication history, user preferences, purchase history, member identification numbers, device fingerprints, personal identification numbers, and other information. Data stores 130 and 135 may be a data repository of a set of integrated objects that are modeled using classes defined in database schemas. Data stores 130 and 135 may further include flat files that can store data. Crowdsourcing platform 125 and/or other servers may collect and/or access data from the data stores 130 and 135.

Figure 2:
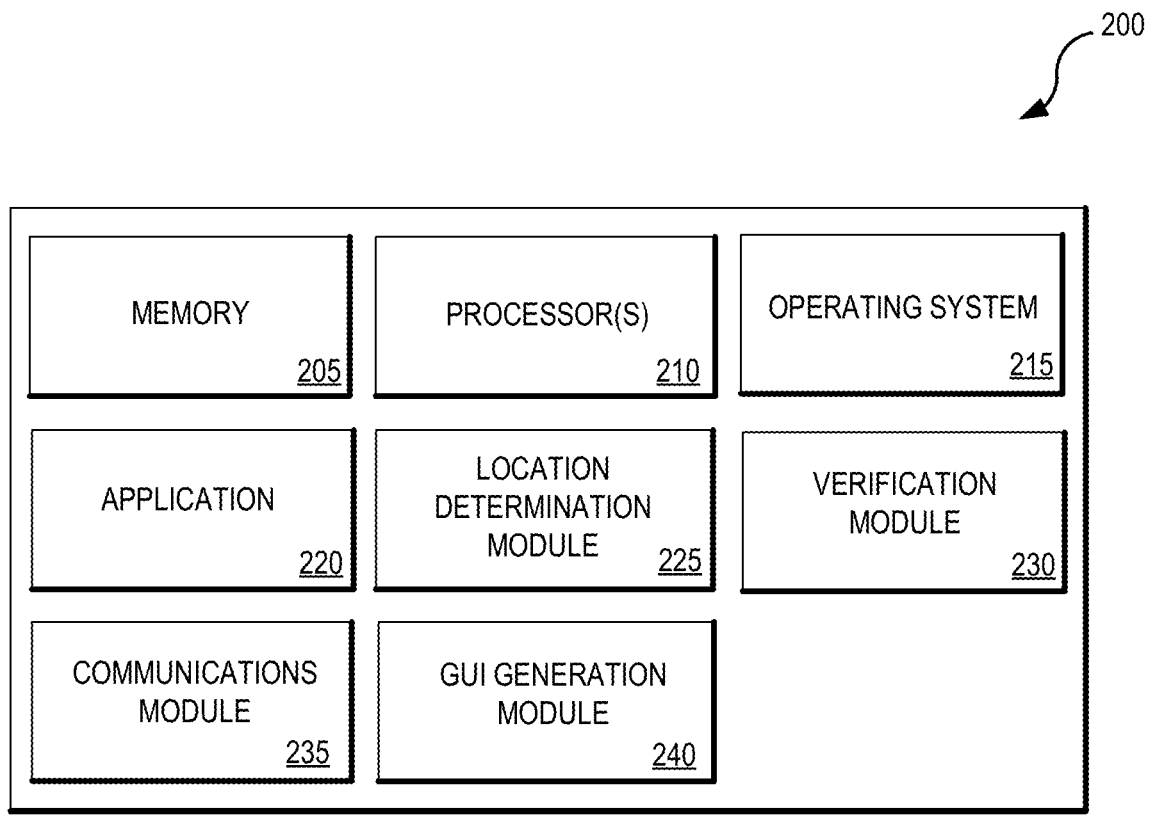
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110A-110M can include memory 205, one or more processors 210, operating system 215, application 220, location determination module 225, verification module 230, communications module 235, and graphical user interface ("GUI") generation module 240. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, location determination module 225 and verification module 230 can be combined into a single component.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, location determination module 225, verification module 230, communications module 235, and GUI generation module 240.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with crowdsourcing platform 125. For example, application 220 can include a crowdsourcing application, money transfer application, social networking application, and gaming application.

Application 220 can access a server or other computing device associated with an organization (e.g., crowdsourcing platform 125) to access credit card account information (e.g., current transaction criteria, current balance of credit card) and to receive notifications relating to a credit card. For example, application 220 may include unanswered verification messages requesting verification of a transaction, user preferences relating to location information, listings of authorized and unauthorized purchases, and other information. Information gathered from the user via application 220 may be communicated to crowdsourcing platform 125 via communications module 235 where the user preferences, transaction authorizations, location information, and other information are used to determine the merchant location.

Location determination module 225 can determine a location of a user by determining a location of a user device (e.g., computing devices 110A-110M) associated with the user. The user device may be located using mobile phone tracking, GPS, real-time locating systems, or other technologies. Location information may include a zip code, an address, a category of merchants, coordinates, or other location information. Location determination module 225 may communicate the location information to application 220, communications module 235 and/or crowdsourcing platform 125.

When the location of the merchant associated with the transaction is not reliably known using traditional methods or using crowdsourced methods (e.g., a confidence level in the location of the merchant is below a threshold), the location of the user device may be used to gather a data point to establish the location of the merchant. Traditional methods may include determining a merchant location from the transaction authorization request and checking an additional field in the transaction authorization request that verifies that the location is the actual location of the POS and not a location of the headquarters.

In some embodiments, the location information of the user device is automatically provided to crowdsourcing platform 125 when the user has agreed to share location information. In other embodiments, location determination module 225 shares location information only when the user responds to a transaction verification request. When a location of the merchant is established at or above the confidence level, the location information gathered from location determination module 225 can be used for other purposes such as to verify that the user authorized a transaction (e.g., compare location of user device with location of POS to determine whether the user is within a predetermined distance of the POS).

Verification module 230 may receive a notification from crowdsourcing platform 125 to verify that the user has authorized a transaction at a particular location (e.g., "Do you (or did you) authorize a purchase for $70.68 at Kohl's® on County Road 2?"). In some embodiments, a response to the notification may include specific location information such as coordinates of the location of the user device. In some embodiments, location information of the user device is sent separately from the response to the notification to crowdsourcing platform 125. If the user responds to the notification, the information can be used for at least two purposes. First, the location information of the user device may be added to database 130 and/or 135 to more particularly establish a location of the merchant. Second, the response may verify that the transaction is authorized by the accountholder. In some embodiments, the accountholder may have a certain timeframe in which to respond to the notification. In some embodiments, the location information is provided to crowdsourcing platform 125 using information in the response (i.e., user provides a location or verification module 230 inserts a location) or location information collected from location determination module 225.

Communications module 235 can send and receive information relating to the transaction including verifications, authorizations, and locations to and from crowdsourcing platform 125. For example, communications module 235 may send location information and verification information from the user device to crowdsourcing platform 125 to establish a merchant location and/or verify that the transaction has been authorized.

GUI generation module 240 can generate one or more GUI screens that allow for interaction with a user. In at least one embodiment, GUI generation module 240 generates a graphical user interface receiving and/or conveying information to the user. For example, the GUI generation module 240 may display a verification interface in which the user can verify that a transaction at a location is authorized.

Figure 3:
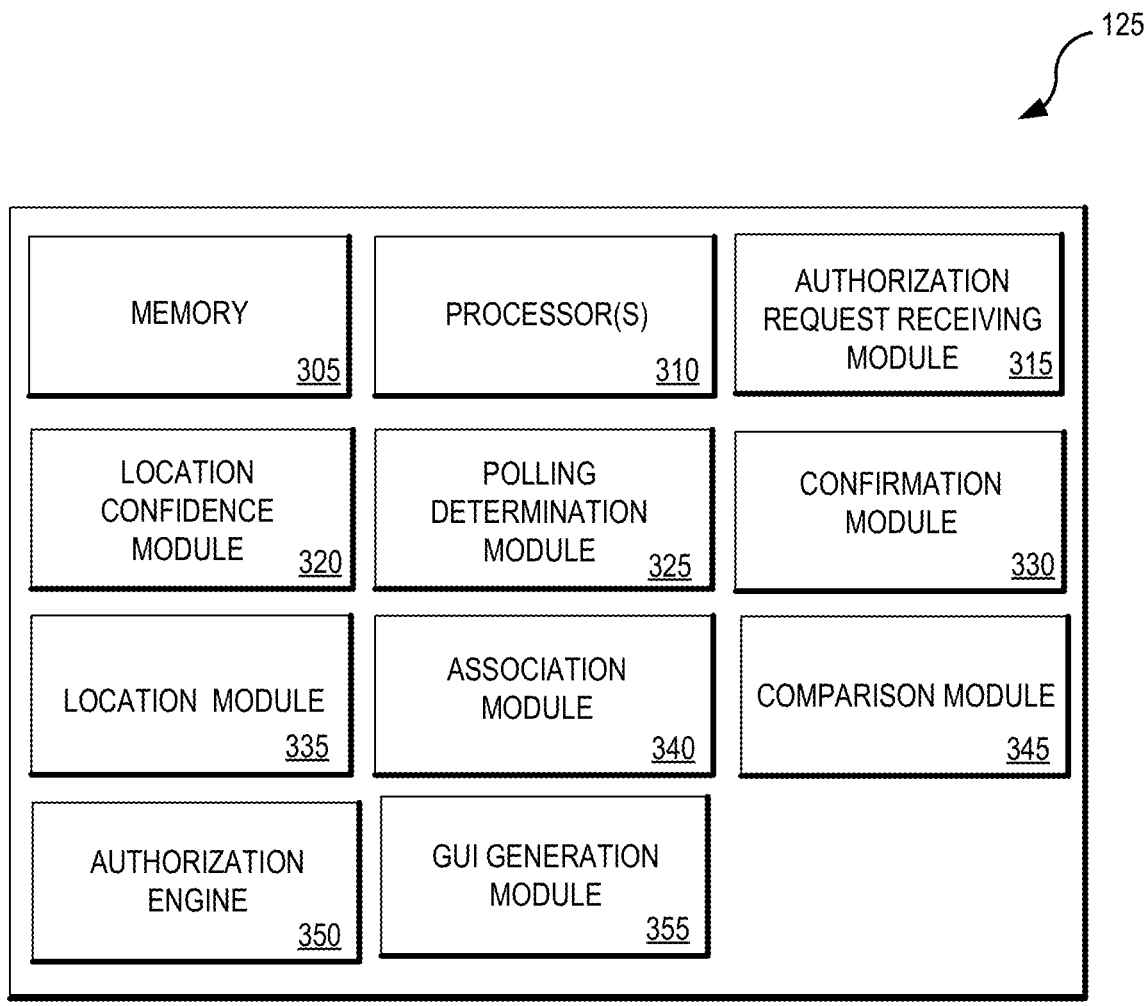
FIG. 3 illustrates various components of a crowdsourcing platform that may be used in accordance with one or more embodiments of the disclosure.

FIG. 3 illustrates a set of components within crowdsourcing platform 125 according to one or more embodiments of the present disclosure. According to the embodiments shown in FIG. 3, crowdsourcing platform 125 can include memory 305, one or more processors 310, authorization request receiving module 315, location confidence module 320, polling determination module 325, confirmation module 330, location module 335, association module 340, comparison module 345, authorization engine 350, and GUI generation module 355. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, confirmation module 330 and location module 335 can be combined into a single module for confirming the transaction and verifying location of the user device.

In some embodiments, the functionality of the components of computing device 110 described with respect to FIG. 2 may be included in one or more components of the crowdsourcing platform 125 described with respect to FIG. 3.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of authorization request receiving module 315, location confidence module 320, polling determination module 325, confirmation module 330, location module 335, association module 340, comparison module 345, authorization engine 350, and GUI generation module 355.

Authorization request receiving module 315 receives an authorization request for a transaction from a POS such as POS 120. The transaction request may include information relating to the transaction. Information relating to the transaction may include the merchant requesting the transaction, a location of the merchant, the amount of the transaction, the items or services being purchased, the date, the time, and other information relating to the transaction.

Location confidence module 320 determines whether the location of the merchant is known and/or verified using traditional methods (e.g., included in the transaction authorization request along with a verification that the merchant location is the merchant location of the POS rather than a location of the merchant headquarters). If so, then the known and verified location is used. If no known and verified location for the merchant is available, location confidence module 320 determines whether crowdsourced location data is available and if so, whether a confidence in the crowdsourced merchant location information exceeds a threshold. The crowdsourced location confidence level may be determined based on a number of user devices polled during transactions (i.e., the more devices polled, the higher the confidence), a consistency of the information resulting from the user devices polled, a comparison of location information provided in the authorization request (if any) and the location information received from the user device, a time between the current transaction and previous results received from other user devices, and timeliness of the replies from the user devices. For example, if the system polls the user device upon receiving the transaction request and no response is received until thirty minutes later, the system may either not use the result or place a low value on the result. On the other hand, if the response is received within two minutes of the transaction authorization request, then the location of the user device may have a higher value. The crowdsourced location confidence level is sent to polling determination module 325 to determine whether additional information is needed to establish the merchant location to a certain confidence level.

Polling determination module 325 receives crowdsourced location confidence level information from location confidence module 320 and determines whether a user device should be polled for location information to achieve another data point in determining the location of the merchant. A crowdsourced location confidence level threshold may establish a level of confidence at or over that which the merchant's determined location is reliable. The crowdsourced location confidence level threshold may be established based on business rules, regulations, category of merchant, and/or relationship with merchant. If the crowdsourced location confidence level falls below the crowdsourced location confidence level threshold, then the merchant's determined location is not reliable and additional data points are needed to establish a reliable merchant location. Therefore, polling determination module 325 sends a request to location module 335 to determine the location of the user device 110. Polling determination module 325 may further send a request to confirmation module 330 to confirm that the user has authorized the transaction and the user device 110 is in the location of the transaction.

In some embodiments, a quality check on the crowdsourced merchant location may be performed periodically resulting in a crowdsourcing confidence level that is lower than the threshold and a polling of the user device. For example, even if the crowdsourced location confidence level for the merchant is above the confidence level threshold generally, the crowdsourced location confidence level may drop periodically to check the accuracy of the crowdsourced merchant location. Thus, user devices may be polled with a certain frequency at certain merchant locations. The frequency may be determined by time between polling user devices, number of transactions between polling, a type of merchant, a longevity of merchant in one location, and information from new sources. In some embodiments, one out of every n transactions may result in a user device being polled to detect movement of the POS. If a timely reply shows a new location, then the confidence in the POS location goes below the threshold and the polling frequency may return to the initial polling rate (e.g., every transaction) to establish the new location. After the confidence level exceeds meets or exceeds the threshold, the polling rate may decrease.

In some embodiments, instead of every nth user device being polled, the frequency of polling may be based on time. For example, one user device every month may be polled. In some embodiments, the frequency is determined by the particular type of store (e.g., traveling merchant or stationary merchant).

In some embodiments, if the crowdsourced location confidence level is above the crowdsourced location confidence level threshold, then the user device may be polled for location information to determine whether the user is within a predetermined distance of the location of the merchant. Polling determination module 325 may further send a request to confirmation module 330 to request that the user confirm that the user authorized the transaction and that the user device is within a distance of the location of the determined merchant location.

Confirmation module 330 sends a confirmation request to a user device associated with the user, asking the user to verify that the user authorized the transaction. The confirmation request may further include a verification of the location of the merchant. For example, the confirmation request may ask "Did (or do) you authorize a purchase for $100 at Walmart?" In some embodiments, prior to sending the confirmation message, confirmation module 330 may determine whether the user has authorized the organization to send a confirmation to the user device (e.g., by checking user preferences).

Location module 335 can receive or determine the location of the user device associated with the accountholder (e.g., using GPS, cellular triangulation). For example, location module 335 may receive a location of the user from location determination module 225, or location module 335 may track the location of the user device associated with the accountholder and determine its location. In some embodiments, location module 335 may receive the location of the user device in an authorization message from the user (e.g., automatically included with the message, selected from a list of possible locations, or input into the message by the user). As discussed above, when a crowdsourced location confidence in the location of the merchant is below a threshold, the location of the user device may be used to determine or enhance a crowdsourced location of the merchant. In some embodiments, location module 335 waits to receive a confirmation from the user that the user has authorized the transaction at the merchant and is located at the merchant location. When the location of the merchant is known or if the crowdsourced location confidence in the location of the merchant is above the threshold, the location of the user device may be used to determine whether the user is within a predetermined distance of the merchant.

Association module 340 receives location information from location module 335. If the location of the user device is to be used to determine the location of the merchant (e.g., confidence in the location of the merchant is below the threshold or an update check to the location is needed), association module 340 may associate the location with the merchant in a database. Location confidence module 320 may use the associated location information to recalculate the confidence in the merchant location during the next transaction. In some embodiments, the location must be determined and recorded within a certain period of time of the authorization request and/or the confirmation from the user to ensure that the location information is accurate.

Comparison module 345 may receive location information relating to the location of the user device from location module 335. In some embodiments, when the location of the merchant (either crowdsourced location or otherwise established location) is established above a certain confidence level, comparison module 345 may compare the location of the user device with the location of the merchant. Comparison module 345 may determine whether the location of the user device is within a predetermined distance of the location of the merchant. The results of the comparison module 345 may be communicated to authorization engine 350 to determine whether the transaction will be authorized or denied. In some embodiments, if the user has responded that the user has authorized the transaction, a comparison may not be necessary or the comparison may be used as an additional security feature.

Authorization engine 350 receives comparison information from comparison module 345, determines whether the transaction should be authorized, and sends an authorization or denial message to POS 120. In some embodiments, the user is required to provide verification that the user authorized the transaction. In other embodiments, only some transactions require user verification before the transaction is authorized.

GUI generation module 355 can generate one or more GUI screens that allow for interaction with a user. In at least one embodiment, GUI generation module 355 generates a graphical user interface receiving and/or conveying information to the user. For example, the GUI generation module 355 may display a transaction verification interface in which a representative can view the verification status of a transaction in addressing a customer question.

Figure 4:
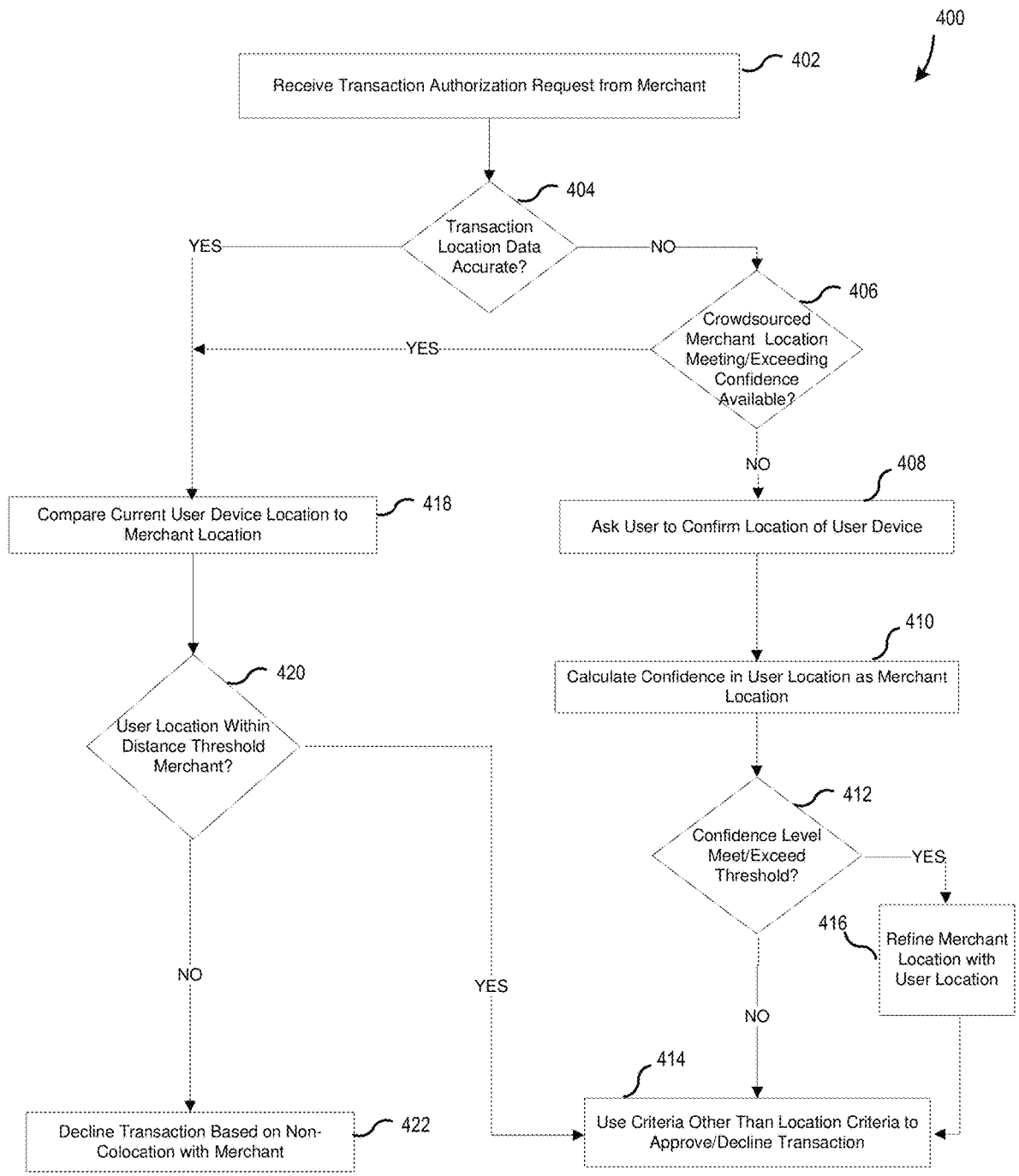
FIG. 4 is a flowchart illustrating a set of operations in accordance with various embodiments of the present disclosure.

FIG. 4 is a flowchart illustrating a set of operations 400 that can be used to crowdsource geolocation data to assist with determining a location of a merchant in accordance with various embodiments of the present disclosure. The operations illustrated in FIG. 4 may be performed by one or more components, devices, or modules such as memory 305, one or more processors 310, authorization request receiving module 315, location confidence module 320, polling determination module 325, confirmation module 330, location module 335, association module 340, authorization engine 350, and GUI generation module 355 or other components, modules, or devices. In some embodiments, fewer than all of the steps are performed, whereas in other embodiments additional operations are performed.

Receiving operation 402 receives a transaction authorization request from a merchant. The transaction authorization request may include information such as merchant name, items for purchase, amount of purchase, merchant location, and a merchant location position indicator. In some embodiments, the merchant location may be a headquarters location or a main branch location of the merchant as opposed to the merchant location associated with the POS issuing the transaction authorization request. The merchant location position indicator may indicate if the merchant location associated with the transaction authorization request is the merchant location associated with the POS.

Decision operation 404 determines whether the merchant location position indicator indicates that the merchant location is the merchant location associated with the POS issuing the transaction authorization request. If the merchant location is determined to be the merchant location associated with the POS issuing the transaction authorization request, then decision operation 404 branches to comparing operation 418. Comparing operation 418 determines the location of the user device and compares the location of the user device to the location data from the transaction authorization request. In some embodiments, the system checks to ensure that the user has authorized the organization to track the location of their user device by agreeing, not opting out, or opting in to location tracking services. If the user has not authorized the use of tracking services, the location of the user device will not be tracked.

Decision operation 420 determines whether the user device is located within a certain distance threshold of the merchant location. If the user device is not located within a certain distance of the merchant location, then decision operation branches to declining operation 422 where the transaction is declined based on the user's location. If the user device is located within the certain distance of the merchant location, then decision operation 420 branches to approving operation 414. Approving operation 414 uses account information instead of the location information to approve or decline the transaction (e.g., PIN, password, and signature). In some embodiments, when the user's location is within a certain distance of the merchant, the location information may be used in addition to the other types of information in determining whether to approve or decline the transaction.

Backtracking to decision operation 404, if the merchant location position indicator indicates that the merchant location is not the merchant location associated with the POS issuing the transaction request, decision operation 404 branches to decision operation 406. Sometimes, the merchant location and/or the merchant location position indicator will not be included in the transaction authorization request. In such cases, decision operation 404 branches to decision operation 406.

Decision operation 406 determines whether crowdsourced merchant location data that has a crowdsourced confidence level that meets or exceeds a confidence level threshold is available for the merchant. The confidence level threshold is a threshold measuring a reliability of the crowdsourced merchant location (i.e., merchant location determined using the location of user devices during transactions). The crowdsourced confidence level may be based on a number of the data points (i.e., user device location during a transaction), accuracy of the data points (e.g., how many of the data points agree), timing of the data points (e.g., were these data points taken recently), type of merchant location (e.g., travelling or stationary), and length of time merchant has stayed in same location.

For example, if only three crowdsourced location data points have been collected for the merchant location, the crowdsourced confidence level may be too low to surpass the threshold. In another example, if many data points have been collected for a merchant location but a sample has not been collected in n number of transactions, the crowdsourced location confidence level may be low until an update crowdsourced location data point can be obtained. In a further example, if several data points have been collected but the data points do not agree on a single merchant location, then the crowdsourced confidence level may be low. In some embodiments, a presumed accuracy of the data points based on a time delay in receiving a response to the authorization request sent to the user device may be factored into the crowdsourced location confidence level (e.g., if a response is received within thirty seconds of the request, the response may be given more weight than a response received two minutes after the authorization request is sent to the user device).

When the system detects that crowdsourced merchant location data that meets or exceeds the threshold crowdsourced location confidence level is available, decision operation 406 branches to comparing operation 418. Comparing operation 418 determines the user device location and compares the user device location with the crowdsourced merchant location. Thereafter, the method proceeds to decision operation 420 and proceeds as discussed above.

Referring back to decision operation 406, when the system detects that the crowdsourced merchant location data does not meet or exceed the threshold confidence level, decision operation 406 branches to confirming operation 408. Confirming operation 408 sends a request to a user device associated with the user asking the user to confirm the location of the user device (e.g., "Did you just authorize a transaction at Target on 5th Street?"). A more precise location of the user device can be obtained using techniques such as GPS or cellular triangulation, which may be collected before, after, or during the confirmation response. In some embodiments, the confirmatory response triggers the collection of the user's precise location. In some embodiments, the location of the user device is communicated via an application associated with the user device such as application 220.

The location confirmation request can be sent via text message, push notification, email, or phone call. Once the system receives a confirmation of the location of the user device, calculating confidence operation 410 calculates a confidence in the user location as the merchant location. The confidence in the user location as the merchant location may be calculated based on the timing of the reply (e.g., did the user reply within two minutes of the receiving the request or did the user reply closer to thirty minutes of receiving request). For example, if the user's location is determined upon receiving a confirmatory response, then a response that is closer in time to the transaction authorization request provides a more accurate location of the merchant because the user likely has not navigated far from the POS. In some embodiments, if the user does not respond within a certain amount of time, the user's location data will not be used as a data point in determining a crowdsourced merchant location.

If the confidence level in the user's location meets or exceeds a threshold, decision block 412 branches to refining operation 416. Refining operation 416 uses the location information collected from the user device as another crowdsourcing location data point to refine the crowdsourced merchant location. From refining operation 416, the user may be approved for the transaction in approving operation 414 using information other than location information to approve or decline the transaction (e.g., PIN, password, and signature). In alternative embodiments, refining operation 416 can branch to comparing operation 418 instead of branching to approving operation 414.

If the confidence level does not meet or exceed the confidence level threshold, decision operation 412 branches to alternative authorizing operation 414. Alternative authorizing operation 414 may authorize or decline the transaction using criteria other than location criteria.

Computer System Overview

Figure 5:
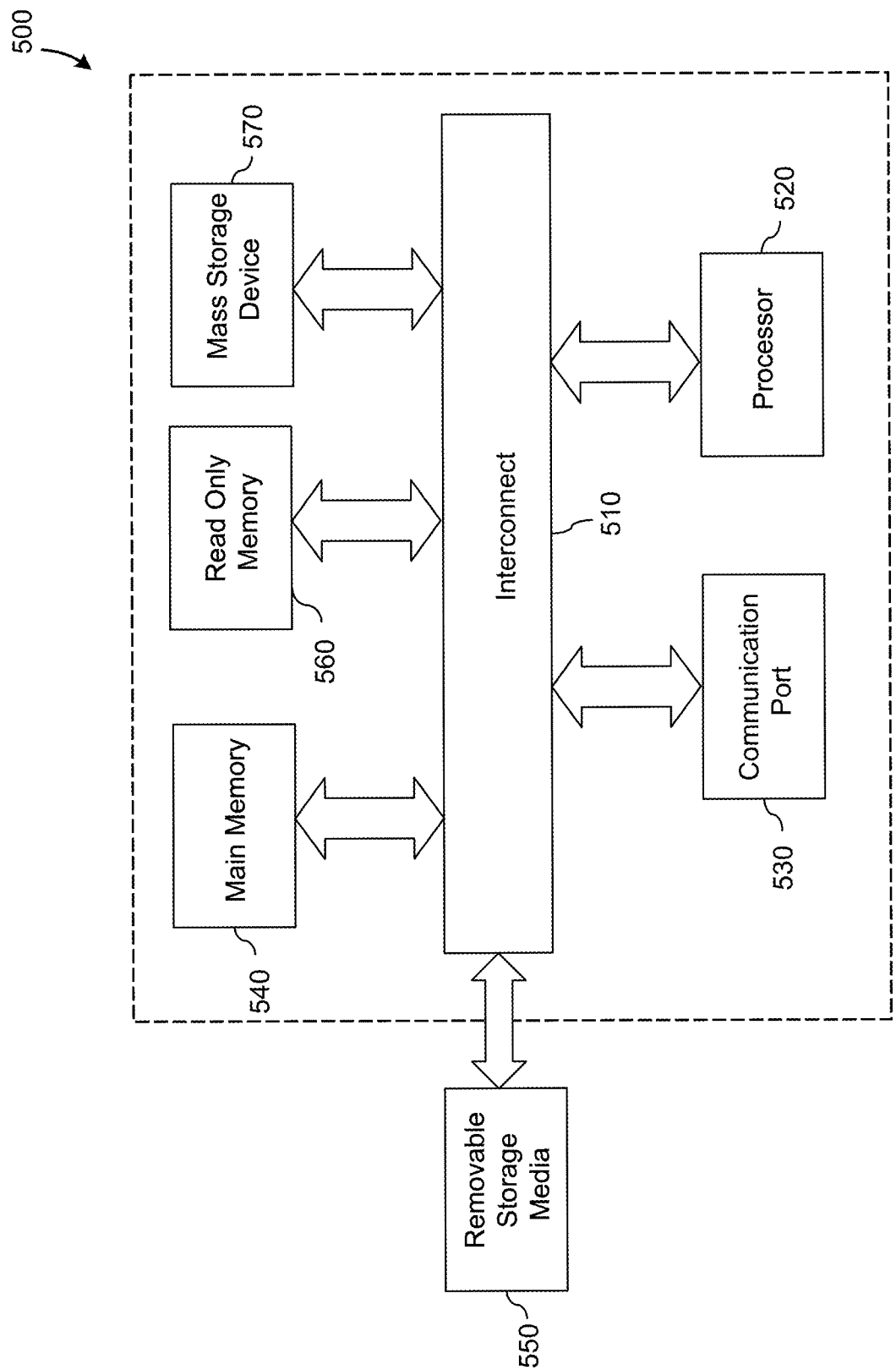
FIG. 5 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system 500 includes an interconnect 510, at least one processor 520, at least one communication port 530, a main memory 540, a removable storage media 550, a read only memory 560, and a mass storage device 570.

Processor(s) 520 can be any known processor. Communication port(s) 530 can be or include, for example, any of an RS-232 port for use with a modem-based dialup connection, a 10/100 Ethernet port, or a Gigabit port using copper or fiber. The nature of communication port(s) 530 may be chosen depending on a network such a Local Area Network (LAN), Wide Area Network (WAN), or any network to which the computer system 500 connects.

Main memory 540 can be Random Access Memory (RAM), or any other dynamic storage device(s) commonly known in the art. Read only memory 560 can be any static storage device(s) such as Programmable Read Only Memory (PROM) chips for storing static information such as instructions for processor 520.

Mass storage device 570 can be used to store information and instructions. For example, hard disks such as the Adaptec® family of SCSI drives, an optical disc, an array of disks such as RAID, such as the Adaptec family of RAID drives, or any other mass storage devices may be used.

Interconnect 510 can be or include one or more buses, bridges, controllers, adapters, and/or point-to-point connections. Interconnect 510 communicatively couples processor(s) 520 with the other memory, storage, and communication blocks. Interconnect 510 can be a PCI/PCI-X or SCSI based system bus depending on the storage devices used.

Removable storage media 550 can be any kind of external hard-drives, floppy drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and deriving or learning location using crowdsourcing techniques. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method comprising:
   in response to receiving a transaction request for a transaction at a point-of-sale device, collecting location data from a device associated with the transaction at the point-of-sale device, wherein the location data is collected from a plurality of devices during a plurality of transactions;
   receiving, at a computer system from the point-of-sale device via a first communication network, transaction data that includes an identification of the point-of-sale device and an identification of a payment vehicle;
   determining, by the computer system, a confidence in a location of the point-of-sale device based on the location data associated with the plurality of devices, wherein the confidence indicates a reliability of the location of the point-of-sale device;
   in response to the confidence of the location of the point-of-sale device being lower than a threshold confidence, determining a location of a device associated with an owner of the payment vehicle; and
   generating, by the computer system, an updated confidence in the location of the point-of-sale device based at least in part on the location of the device associated with the owner of the payment vehicle.

2. The computer-implemented method of claim 1, wherein determining the location of the device associated with the owner of the payment vehicle comprises:
   transmitting, via a second communications network, a communication to the device associated with the owner of the payment vehicle requesting confirmation that a transaction associated with the transaction data was authorized; and
   collecting or receiving the location of the device associated with the owner of the payment vehicle.

3. The computer-implemented method of claim 2, further comprising receiving a confirmation message indicating that the transaction associated with the transaction data was authorized.

4. The computer-implemented method of claim 3, wherein the confirmation message indicates the location of the device associated with the owner of the payment vehicle.

5. The computer-implemented method of claim 1, wherein the confidence is further calculated based on at least one of: a consistency of location information resulting from the devices polled or a time between receiving the location information from the device being polled and receiving the transaction request.

6. The computer-implemented method of claim 1, wherein when the confidence of the location of the point-of-sale device is above the threshold confidence, the method further comprises:
   comparing the location of the device associated with the owner of the payment vehicle with the location of the point-of-sale device; and
   authorizing the transaction when the location of the device associated with the owner of the payment vehicle is within a predetermined distance of the location of the point-of-sale device.

7. The computer-implemented method of claim 1, wherein the location of the device associated with the owner of the payment vehicle is determined using at least one of: a Wi-Fi signal, a radio-frequency identification signal, an near field communications signal, a satellite signal, a cellular signal, a Bluetooth signal, or an indication received from a user associated with the device.

8. The computer-implemented method of claim 1, further comprising:
   comparing the updated confidence with the threshold confidence; and
   revising the location of the point-of-sale device based on the location of the device associated with the owner of the payment vehicle when the updated confidence meets or exceeds the threshold confidence.

9. A non-transitory computer-readable storage medium containing a set of instructions that, when executed by one or more processors, cause a machine to:
   in response to receiving a transaction request at a point-of-sale device, collect location data from a device associated with the transaction at the point-of-sale device, wherein the location data is collected from a plurality of devices during a plurality of transactions;
   receive, from the point-of-sale device via a first communication network, transaction data that includes an identification of the point-of-sale device and an identification of a payment vehicle;
   determine a confidence in a location of the point-of-sale device based on the location data associated with the plurality of devices;
   in response to the confidence of the location of the point-of-sale device being lower than a threshold confidence, determine a location of a device associated with an owner of the payment vehicle; and
   generate an updated confidence in the location of the point-of-sale device based at least in part on the location of the device associated with the owner of the payment vehicle.

10. The non-transitory computer-readable storage medium of claim 9, wherein the set of instructions, that when executed by the one or more processors, cause the machine to determine the location of the device associated with the owner of the payment vehicle, further cause the machine to:
  transmit, via a second communications network, a communication to the device associated with the owner of the payment vehicle requesting confirmation that a transaction associated with the transaction data was authorized; and
  collect or receive the location of the device associated with the owner of the payment vehicle.

11. The non-transitory computer-readable storage medium of claim 10, wherein the set of instructions, when executed by the one or more processors, further cause the machine to receive a confirmation message indicating that the transaction associated with the transaction data was authorized.

12. The non-transitory computer-readable storage medium of claim 11, wherein the confirmation message indicates the location of the device associated with the owner of the payment vehicle.

13. The non-transitory computer-readable storage medium of claim 9, wherein the confidence is further calculated based on a time between receiving the location information from the device being polled and receiving the transaction request.

14. The non-transitory computer-readable storage medium of claim 9, wherein in response to the confidence of the location of the point-of-sale device being above the threshold confidence, the set of instructions, when executed by the one or more processors, further cause the machine to:
  compare the location of the device associated with the owner of the payment vehicle with the location of the point-of-sale device; and
  authorize the transaction when the location of the device associated with the owner of the payment vehicle is within a predetermined distance of the location of the point-of-sale device.

15. The non-transitory computer-readable storage medium of claim 9, wherein the location of the device associated with the owner of the payment vehicle is determined using at least one of: a Wi-Fi signal, a radio-frequency identification signal, a near field communications signal, a satellite signal, a cellular signal, a Bluetooth signal, or an indication received from a user associated with the device.

16. The non-transitory computer-readable storage medium of claim 9, wherein the set of instructions, when executed by the one or more processors, further cause the machine to:
  compare the updated confidence with the threshold confidence; and
  revise the location of the point-of-sale device based on the location of the device associated with the owner of the payment vehicle when the updated confidence meets or exceeds the threshold confidence.

17. A data processing system for determining a location of a point-of-sale, the data processing system comprising:
  at least one computer having a microprocessor for computing data input to the computer;
  at least one site management application including at least one of a software or firmware installation that provides computer coded instructions to the computer for managing data manipulated by the computer;
  at least one database communicating with the computer for storing data regarding a threshold confidence of a location of a point-of-sale device;
  data inputs from the point-of-sale device to the computer detailing:
    location data from a device associated with a transaction at the point-of-sale device, wherein the location data is collected from a plurality of devices during a plurality of transactions;
    transaction data that includes an identification of the point-of-sale device and an identification of a payment vehicle, and
    a location of a device associated with the owner of the payment vehicle; and
  outputs generated by the data processing system including:
    a confidence of the location of the point-of-sale device based on the location data associated with the plurality of devices; and
    an updated confidence in the location of the point-of-sale device based at least in part on the location of the device associated with the owner of the payment vehicle in response to the confidence of the location of the point-of-sale device being lower than the threshold confidence.

18. The system of claim 17, further comprising a user interface generated by the data processing system and including an updated location of the point-of-sale device when a comparison of the updated confidence meets or exceeds the threshold confidence.

19. The system of claim 17, wherein the at least one database communicating with the computer further is for storing data regarding at least one of: a number of devices polled during transaction requests, a consistency of location information resulting from the devices polled, or a time between receiving the location information from the device being polled and receiving the transaction request.

20. The system of claim 19, wherein the computer coded instructions include instructions for calculating the confidence based at least in part on at least one of: the number of devices polled during transaction requests, the consistency of location information resulting from the devices polled, or the time between receiving the location information from the device being polled and receiving the transaction request.

* * * * *